United States Patent [19]

White

[11] 3,897,575

[45] July 29, 1975

[54] PREPARATION OF PHOSPHATIC ANIMAL FEEDS

[75] Inventor: Edward A. White, Glenview, Ill.

[73] Assignee: International Minerals & Chemical Corporation, Libertyville, Ill.

[22] Filed: Aug. 8, 1972

[21] Appl. No.: 278,706

[52] U.S. Cl. ............... 426/511; 426/381; 423/203; 423/167; 423/311
[51] Int. Cl. .......... A23l 1/10; A23l 1/20; C01f 1/00; C01f 5/00; C01f 11/00
[58] Field of Search.... 423/166, 167, 203, 305–309, 423/311, 313; 426/381, 74, 220

[56] References Cited
UNITED STATES PATENTS

| | | | |
|---|---|---|---|
| 2,143,865 | 1/1939 | Copson | 423/308 |
| 2,499,385 | 3/1950 | Hubbuch | 423/167 |
| 2,865,710 | 12/1958 | Le Baron | 423/167 |
| 3,142,534 | 7/1964 | Nickerson | 423/167 |
| 3,235,330 | 2/1966 | Lapple | 423/167 |
| 3,292,995 | 12/1966 | Allen | 423/167 |

*Primary Examiner*—Oscar R. Vertiz
*Assistant Examiner*—Gregory A. Heller
*Attorney, Agent, or Firm*—Peter Andress; James E. Wolber

[57] ABSTRACT

An animal feed supplement is prepared from fluorine-containing phosphate rock by introducing the phosphate rock in finely divided form into a reactor wherein a temperature above the melting point of the phosphate rock and a steam atmosphere are maintained so that the phosphate rock melts and fluorine is evolved. Continuous movement of the phosphate rock is maintained in the reaction zone to avoid any substantial accumulation of molten phosphate. The molten phosphate is then rapidly quenched to produce a solid product having a P/F weight ratio greater than about 100 with substantially all of the phosphate content thereof as alpha-tricalcium phosphate.

15 Claims, No Drawings

PREPARATION OF PHOSPHATIC ANIMAL FEEDS

BACKGROUND OF THE INVENTION

This invention relates to the defluorination of phosphate rock and, more particularly, to the preparation of an animal feed supplement from phosphate rock.

Phosphorus is an essential nutritional element in the diets of domestic animals and fowl. Phosphate feed supplements are added to animal and poultry feeds to raise the phosphorus contents thereof to specified levels in order to eliminate phosphorus deficiencies in diets. The principal sources of phosphorus for preparing the feed supplements are the natural deposits of phosphate rocks. The mineral phosphates of all of the commercially exploited natural deposits in the United States and in most foreign countries unfortunately have a relatively high content of combined fluorine. This fluorine content, which may be as great as 3.8% or higher, would cause detrimental effects in animals fed the feed supplements prepared from the phosphate rock if it is not reduced to an acceptable level during the preparation of the feed phosphates. The weight ratio of phosphorus to fluorine, P/F weight ratio, in feed grade phosphates is preferably greater than about 50, and still more preferably greater than about 100.

Another factor to consider in the preparation of phosphatic feed supplements is the availability of the phosphorus. The phosphorus should be in the orthophosphate form or an equivalent state such as found in alpha-tricalcium phosphate so that it can best be assimilated by the animals. In addition, 80% or more of the phosphate should be soluble in neutral ammonium citrate.

A variety of processes have been suggested for use in preparing defluorinated phosphates from phosphate rock. For example, phosphate feed supplements of low fluorine content may be prepared from phosphate rock by processes which entail acidulating the phosphate rock, extracting the solubilized phosphate values of the acidulated rock with an aqueous medium, and processing the phosphate-rich extract so as to obtain a feed grade dicalcium phosphate. Thermal defluorination processes are also known. In one type of thermal process, the phosphate rock is calcined at temperatures below the melting point of the rock, but sufficiently high to volatilize the fluorine and to cause the $P_2O_5$ content of the rock to be in the alpha-tricalcium form. Temperatures ranging from about 1800° F. to about 2700° F. are used in such processes. In another type of thermal defluorination process, the phosphate rock is melted in the presence of steam to evolve the fluorine content thereof.

An example of the latter type of process is described in U.S. Pat. No. 2,143,865 of Copson. In this process fluorine is removed from phosphate rock containing the same in combined form by contacting a pool of molten phosphate rock with steam for a period of about 10 to 20 minutes. A similar process is described in U.S. Pat. No. 2,220,575 of Luscher.

Le Baron, U.S. Pat. No. 2,865,710, is directed to a process for producing alpha-tricalcium phosphate animal feed material from fluorine-containing superphosphate without the addition of steam. The Le Baron patent describes a process wherein a fluorine-containing superphosphate is introduced into a mass of the same material maintained in a molten state, and at least a portion of the molten mass is removed when it is homogeneous and quenched to obtain a solid alpha-tricalcium phosphate.

One disadvantage of the thermal processes which have been heretofore proposed for preparing phosphatic animal feed supplements is the time required to obtain a product of acceptable fluorine content. The aforementioned calcination processes may require at least as long as about 45 minutes. The processes which involve the melting of the phosphate do not require as long a time, but at least 10 minutes is required.

A process for treating phosphate rock in a minimum of time to obtain the phosphorus content thereof in a different form is described in German Pat. No. 2,053,206. In this process, finely-divided phosphate ore is introduced into a reaction zone heated with a plasma gas to produce elemental phosphorus. The residence time required in this process is only from about 20 milliseconds to 20 seconds. However, researchers in this technology have been unable to adapt the process of the German patent to one for producing an acceptable tricalcium phosphate animal feed supplement.

SUMMARY OF THE INVENTION

This invention is based on the discovery of a process for preparing a phosphate animal feed supplement having a low fluorine content and substantially all of the phosphate content thereof in the alpha-tricalcium phosphate form. The process of this invention possesses the advantage over those heretofore proposed for preparing a phosphate animal feed supplement from phosphate rock that the final product is produced in a minimum of time, namely, within a matter of seconds.

Briefly, the process of this invention comprises introducing a finely divided fluorine-containing phosphate rock into a reactor wherein a temperature above the melting point of the phosphate rock and a steam atmosphere are maintained. The process is conducted so that there is continuous movement of the phosphate within the reactor to avoid any substantial accumulation of molten phosphate as the rock melts to volatilize fluorine. The phosphate is obtained from the reactor as drops of molten phosphate which are rapidly quenched to produce a solid phosphate product primarily comprising alpha-tricalcium phosphate having an elemental P/F weight ratio greater than about 50, and preferably greater than about 100. Moreover, the citrate solubility of the product prepared in accordance with this invention is high.

Accordingly, it is an object of this invention to provide a process for preparing an animal feed supplement from phosphate rock.

Another object of this invention is to provide a process for manufacturing a phosphate product of low fluorine content.

Still another object of this invention is to provide a process for preparing an alpha-tricalcium phosphate animal feed supplement.

A further object of this invention is to provide a process for producing a defluorinated phosphate in a minimum of time.

These and further objects of this invention will become apparent or be described as the description thereof herein proceeds.

DESCRIPTION OF THE PREFERRED EMBODIMENTS

The raw phosphate rock used in the present method contains fluorine as fluoroapatite. Silica is also present in the rock as another impurity, and the silica content will generally vary within the range of from about 1% to about 10% by weight. The phosphate rock, which may be either calcined or uncalcined, will be introduced into the reactor in finely divided form, generally less than 0.15 millimeter in size. Less finely divided material may, however, be used. The raw phosphate is best treated when it is finely ground so that at least about 50% is capable of passing through a 200 mesh screen (Tyler Standard).

The finely divided phosphate rock is introduced into the reactor and is continuously moved through the reactor, even when the rock particles melt due to the heat to which they are subjected, to avoid any substantial accumulation of molten phosphate. The reaction zone of the reactor wherein the raw phosphate is melted in the presence of steam with the concomitant evolution of fluorine gas is typically tubular in configuration with a circular cross-section, although other cross-sections such as hexagonal may be also used. The dimensions of the reactor will vary in accordance with the desired flow rate of the phosphate and other factors to be hereinafter described, but will typically have a cross-sectional area of from about 0.10 to about 2.0 square feet and a length of from about 1.5 to about 6 feet for flow rates of from about 1,000 to about 6,000 pounds per hour of phosphate.

The reactor may be positioned so that the movement of the phosphate therethrough is horizontal, vertical, or at any between-angle. It will be evident that if the reactor is positioned so that the movement of the phosphate is not downwardly within about 45° of the vertical, it will be necessary to provide means for maintaining the phosphate rock in suspension. In such cases the suspension of the phosphate may be accomplished by means such as the turbulence from injection of the rock, movement of steam and/or inert gas introduced into the reaction zone, or a combination of two or more of such means. The movement of the phosphate rock will, therefore, be most advantageously in a substantially downwardly direction, whereby the continuous movement of the phosphate will be aided by its free fall within the reaction zone.

The temperature in the reactor will be sufficiently high that the raw phosphate introduced therein will be placed in a molten state or condition as quickly as possible, namely, at a temperature above the melting point of the phosphate. This temperature will generally be at a minimum of about 1,500° C. for most phosphates. The reaction temperature will preferably be from about 1,700° to about 2,100° C., or even higher.

The reaction zone may be heated to the required temperature by any number of suitable means. The reaction zone temperature may be achieved, as for example, by burning oil or a gas such as natural gas or propane and passing the hot combustion gases through the reaction zone in the desired direction. The reactor may also be heated electrically such as by electric resistance heating, electric arcs, and induction heating. Still another method of heating the reactor is by a plasma jet using argon as the plasma gas. The required reaction temperature may also be obtained by introducing preheated steam into the reactor with the phosphate rock.

The presence of steam in the reactor is important in producing a phosphate feed of high availability. A minimum of one mole of steam for each mole of diatomic fluorine ($F_2$) to be evolved from the rock is used. An excess of steam, as for example, up to 30 moles of steam per mole of diatomic fluorine, is preferred. The atmosphere maintained in the reactor will generally contain at least 5% by volume steam, but an atmosphere of up to 100% steam may be used. The steam may be continuously introduced into the reactor by the injection of steam or water or, if the reactor is heated by the passage of hot combustion gases through it, by the use of a fuel having a sufficient hydrogen content so as to produce the desired steam atmosphere in the combustion products.

The direction of the flow of the steam and inert gas, if used, in the reaction zone will usually be concurrent with the direction of movement of the phosphate in view of the finely divided state of the phosphate rock introduced into the reactor. If the axis of the elongated reactor is substantially off the vertical so that the movement of the phosphate is accomplished by entrainment of the same in gases in the reactor, the movement of the gases and phosphate will obviously be in the same direction.

The retention time of the phosphate in the heated reaction zone wherein the steam atmosphere is maintained will be sufficient to melt the same and evolve fluorine so as to produce an alpha-tricalcium phosphate upon quenching of the same. This will be within seconds, and generally within the range of from about 0.01 to about 10 seconds.

It will be obvious to one skilled in the art that variables in conducting the instant process such as the dimensions of the reactor, reaction temperature, quantity of steam used, and retention time of the phosphate within the reaction zone will depend upon each other, as well as other factors such as the nature and fineness of the rock introduced into the reactor, the rate of introduction of the rock, and the effectiveness of contact between rock and steam. These interrelated factors in conducting the process may be readily determined by one skilled in the art for any given set of conditions.

The speed with which molten phosphate recovered from the reaction zone is quenched is an important factor in obtaining an acceptable alpha-tricalcium feed phosphate material. The quenching should be accomplished before the time the molten phosphate cools to about 1,100° C., which is usually within about 0.030 second after the phosphate leaves the reaction zone. The quenching of the molten phosphate may be accomplished in any suitable manner. One method is to direct the stream of molten phosphate drops obtained from the reactor into a body of water. Another suitable method of quenching is to direct a jet or plurality of jets of water into the stream of material being discharged from the reactor.

The production of the feed phosphate from phosphate rock in accordance with the instant invention is preferably carried out under essentially a neutral or reducing atmosphere, i.e., an atmosphere free of oxygen gas or other oxidizing agent. This may be accomplished by using a 100% steam atmosphere, introducing an inert gas into the reaction zone, or, in the case of the reactor being heated by the passage of hot combustion gases through the reaction zone, the oxygen-to-fuel ratio is adjusted so that the combustion products contain at least a small amount of carbon monoxide.

The presence of silica has a marked effect upon the degree of defluorination accomplished in the reactor. The silica must be present in the amount at least equivalent for reaction with the quantity of fluorine to be driven off during the process, which is one mole of $SiO_2$ per mole of fluorine gas ($F_2$). The amount of silica will preferably be within the range of from about 1.0 to about 2.0 moles of $SiO_2$ per mole of fluorine. Amounts in excess of that necessary to achieve the desired degree of defluorination may be used, but are, of course, economically impractical. Low grade phosphate rock, as for example, 68% BPL (bone phosphate of lime) rock, generally contains adequate amounts of silica. Phosphate rock also contains minor quantities of $Al_2O_3$ as an impurity. Inasmuch as this aluminum impurity will also react with the fluorine under the reaction conditions of this invention, a portion of the aforementioned silica requirement will be satisfied by the $Al_2O_3$. Phosphate rock containing large proportions of phosphate, e.g., 75% or greater BPL, often requires the addition of silica to bring the quantity up to the aforementioned minimum. The silica may be in either a colloidal or semi-colloidal form. Gelatinous silica obtained by precipitation from fluosilicic acid is an effective form of silica, as are finely-divided forms such as diatomaceous earth. Other useful forms of solid silica are micronized sand and powdered rock materials of a relatively high silica content such as perlite.

An advantage of the process of the instant invention is that one or more so-called "trace elements" can be added to the reactor in minor amounts to produce an alpha-tricalcium phosphate product containing the same. These materials are those elements that are known in the art to be nutritionally essential in small amounts in the diets of animals and include, for example, iron, cobalt, manganese, copper, and zinc. The advantage in adding the trace elements to the phosphate product during its preparation is that they will be more uniformly distributed throughout the feed than if the elements are mechanically mixed with the final product. The beneficial results obtained by the addition of these trace elements are well-known in the art. For example, compounds of iron and copper promote hemoglobin regeneration when fed to livestock and poultry. Manganese is essential in small amounts to the healthy growth of poultry. A small amount of zinc fed to swine minimizes the possibility of the animals developing parakaratosis. These materials may be added to the reactor as their oxides, but other compounds thereof such as fluorine-free salts may be also used. Sodium may be similarily added to the reactor as sodium metal or a sodium salt to obtain a feed product having an increased sodium content. If it is desired to obtain a product having a greater phosphorus content than can be produced using an available phosphate rock, elemental phosphorus may be added with the rock to obtain the desired phosphate content.

The following non-limiting examples will serve to further illustrate the process of this invention.

EXAMPLE I

A calcined Florida phosphate pebble rock, having a phosphate content of 68% BPL (bone phosphate of lime) before calcination, is ground to 50% minus 200 mesh. A typical analysis of the calcined rock is 33.0% $P_2O_5$, 48.0% CaO, 9.2% $SiO_2$, and 3.87% F. This rock is introduced into the upper end of a vertical reactor at the rate of 6,300 pounds per hour with 200 pounds per hour of dry steam at 50 p.s.i.g. The reactor, which has a circular cross-section of 5-inch inside diameter and is 20 inches long, is heated with a 3,500 KW electric arc. An additional 1,260 pounds per hour of 50 p.s.i.g. dry steam is added to the reactor through an inlet located between the electrodes. The retention time of the phosphate in the reactor, which is maintained at a temperature of about 1,927° C., is less than 0.01 second. Water is injected into the stream of molten phosphate leaving the reaction zone through angular jets located immediately downstream of the reactor at the rate of 7,700 pounds an hour to quench the reaction mixture. The temperature of the solids after quenching is about 125° C. Product is recovered from this process at the rate of 6,000 to 6,020 pounds per hour. This product is essentially an alpha-tricalcium phosphate having an analysis of 15% P, 36% Ca and less than 0.15% F.

EXAMPLE II

The procedure outlined in Example I is repeated, except that a 77% BPL calcined phosphate rock is introduced at the rate of 5,750 pounds an hour into the reactor with 155 pounds of ground silica. The rock introduced into the reactor has an analysis of 36.9% $P_2O_5$, 52.0% CaO, 3.8% $SiO_2$ and 4.1% F. The product obtained from the reactor at a rate of about 5,650 pounds an hour is quenched with water at a rate of 7,300 pounds an hour to produce a highly acceptable alpha-tricalcium phosphate product having an analysis of 16% P, 37% Ca and less than 0.16% F.

EXAMPLE III

When the procedure outlined in Example II is repeated except that 135 pounds per hour of vaporized elemental phosphorus is mixed with the steam of phosphate rock and introduced into the reactor, 5,335 to 5,931 pounds per hour of a product having an analysis of 17.7% P, 34.2% Ca and less than 0.17% F is obtained.

EXAMPLE IV

The sodium content of the product obtained by the procedure of Example II is increased by introducing liquid sodium metal into the reactor with the phosphate rock and steam at the rate of 278 pounds an hour. The analysis of the quenched alpha-tricalcium phosphate product is 15% P, 35% Ca, 4.6% Na and less than 0.15% F.

EXAMPLE V

When melted sodium metal is introduced into the reactor at the rate of 293 pounds per hour with the phosphate rock, phosphorus, and steam, as outlined in Example III, a product having an analysis of 14.6% P, 33.7% Ca, 4.6% Na, and less than 0.14% F, is recovered at the rate of 6,300 to 6,320 pounds an hour.

It can be seen from the foregoing description of the instant invention, as well as the accompanying examples, that it is directed to a superior process for producing a highly acceptable animal feed supplement material. As described, the instant invention produces an alpha-tricalcium phosphate product of high availability within a very short time, as compared to the processes of the prior art.

I claim:

1. In a process for producing a phosphatic animal feed material by introducing phosphate rock and steam into a reaction zone wherein a temperature above the melting point of said phosphate rock is maintained, whereby said phosphate rock melts and fluorine is evolved, the improvement which comprises introducing said phosphate rock in finely-divided form into said reaction zone wherein a residence time of from about 0.01 to about 10 seconds is maintained, maintaining continuous suspended movement of said phosphate rock in said reaction zone during and after its melting to avoid any substantial accumulation of molten phosphate, and rapidly quenching molten phosphate recovered from said reaction zone to produce a solid product having a P/F weight ratio greater than 50 with phosphate in the form of alpha-tricalcium phosphate.

2. The process in accordance with claim 1 wherein a temperature of at least about 1,500° C. is maintained in said reaction zone.

3. The process in accordance with claim 2 wherein steam is continuously introduced into said reaction zone to provide at least about 1 mole of steam per mole of fluorine gas to be evolved.

4. The process in accordance with claim 3 wherein molten phosphate recovered from said reaction zone is quenched before the temperature thereof is about 1,100° C.

5. The process in accordance with claim 4 wherein said phosphate rock introduced into said reaction zone is less than 0.15 millimeter in size.

6. The process in accordance with claim 5 wherein said phosphate rock contains silica in the amount of at least about one mole of $SiO_2$ per mole of fluorine gas to be evolved.

7. The process in accordance with claim 5 wherein silica is introduced into said reaction zone in an amount to provide therein at least one mole of $SiO_2$ per mole of fluorine gas to be evolved.

8. The process in accordance with claim 5 wherein silica is introduced into said reaction zone so as to provide therein from about 1.0 to about 2.0 moles of $SiO_2$ per mole of fluorine gas to be evolved.

9. The process in accordance with claim 5 wherein a reducing atmosphere is maintained in said reaction zone.

10. The process in accordance with claim 9 wherein a temperature within the range of from about 1,700° to about 2,100°C. is maintained in said reaction zone.

11. The process in accordance with claim 9 wherein steam is continuously introduced into said reaction zone to provide from about one mole to about 30 moles of steam for each mole of fluorine gas to be evolved and an atmosphere of at least about 5 volume percent steam.

12. The process in accordance with claim 11 wherein at least about 50% of said phosphate rock introduced into said reaction zone is 200 mesh in size.

13. The process in accordance with claim 9 wherein said reaction zone is heated with an electric arc.

14. The process in accordance with claim 9 wherein said reaction zone is heated by introducing preheated steam into said reaction zone.

15. The process in accordance with claim 9 wherein at least one compound of an element of the group consisting of iron, cobalt, manganese, copper and zinc is added in a minor amount to said reaction zone with said phosphate rock.

* * * * *